US012662016B2

(12) United States Patent
Singh et al.

(10) Patent No.: US 12,662,016 B2
(45) Date of Patent: Jun. 23, 2026

(54) CONTROL OF AN HETEROGENOUS ENERGY STORAGE SYSTEM

(71) Applicant: VOLVO TRUCK CORPORATION, Gothenburg (SE)

(72) Inventors: Shailesh Singh, Gothenburg (SE); Faisal Altaf, Västra Frölunda (SE); Anton Klintberg, Torslanda (SE); Adam Josefsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 27 days.

(21) Appl. No.: 18/976,493

(22) Filed: Dec. 11, 2024

(65) Prior Publication Data

US 2025/0206189 A1      Jun. 26, 2025

(30) Foreign Application Priority Data

Dec. 22, 2023    (EP) ..................................... 23219637

(51) Int. Cl.
B60L 58/18        (2019.01)
B60L 58/12        (2019.01)
H01M 10/42        (2006.01)
H01M 10/48        (2006.01)

(52) U.S. Cl.
CPC ............... B60L 58/18 (2019.02); B60L 58/12 (2019.02); H01M 10/425 (2013.01);
(Continued)

(58) Field of Classification Search
CPC .......... B60L 58/18; B60L 58/12; B60L 58/10; B60L 58/13; B60L 58/16; B60L 58/21;
(Continued)

(56) References Cited

U.S. PATENT DOCUMENTS

| | | | | |
|---|---|---|---|---|
| 11,289,921 B1 * | 3/2022 | Hall | ......................... | H02J 7/575 |
| 11,745,621 B2 * | 9/2023 | Youn | ....................... | B60L 58/22 |
| | | | | 320/132 |

(Continued)

FOREIGN PATENT DOCUMENTS

| | | | | | |
|---|---|---|---|---|---|
| EP | | 4145157 A1 * | 3/2023 | ............. | G01R 19/12 |
| GB | | 2600757 A * | 5/2022 | ................ | H02J 7/84 |
| WO | WO-03103071 A2 * | 12/2003 | | ............ | H01M 10/46 |

OTHER PUBLICATIONS

Cong=Sheng et al., "Estimating Battery Pack SOC Using a Cell-to-Pack Gain Updating Algorithm," 2018, Publisher: IEEE.*

(Continued)

*Primary Examiner* — Tuan C To
(74) *Attorney, Agent, or Firm* — Jeffri A. Kaminski; Venable LLP

(57)        ABSTRACT

A computer system for controlling an energy storage system with heterogenous battery packs is provided. The system, using a processing circuitry, obtains pack-specific minimum and maximum allowed operating voltages for each battery pack; determines joint ESS-specific minimum and maximum voltage limits satisfying each of the respective pack-specific minimum and maximum allowed operating voltages for all of the battery packs; obtains actual state of charge, SoC, values for each battery pack; determine rescaled SoC values by scaling the actual SoC value for a battery pack to a range defined by an estimated SoC value of the battery pack at the ESS-specific minimum and maximum voltage limits, and controls the ESS using the rescaled SoC values for the battery packs.

14 Claims, 3 Drawing Sheets

(52) U.S. Cl.
CPC .. _H01M 10/482_ (2013.01); _H01M 2010/4271_
_(2013.01); _H01M 2220/20_ (2013.01)

(58) Field of Classification Search
CPC ........... B60L 2240/547; B60L 2260/42; B60L
2260/44; H01M 10/425; H01M 10/482;
H01M 2010/4271; H01M 2220/20; H01M
10/48; G01R 31/367
USPC ........................................................... 701/22
See application file for complete search history.

(56) References Cited

U.S. PATENT DOCUMENTS

| | | | | |
|---|---|---|---|---|
| 2007/0247115 A1* | 10/2007 | Ishikawa | ................... | H02J 7/54 |
| | | | | 320/119 |
| 2008/0156551 A1 | 7/2008 | Kawahara et al. | | |
| 2008/0278114 A1* | 11/2008 | Maegawa | ................. | H02J 7/52 |
| | | | | 320/135 |
| 2018/0111599 A1 | 4/2018 | Wang et al. | | |
| 2021/0316636 A1 | 10/2021 | Gelso et al. | | |
| 2022/0324350 A1* | 10/2022 | Youn | ....................... | B60L 58/22 |
| 2023/0117104 A1 | 4/2023 | Sharma et al. | | |
| 2023/0140732 A1 | 5/2023 | Ayad | | |

OTHER PUBLICATIONS

Extended European Search Report in corresponding European Application No. 23219637.8 dated Jun. 10, 2024 (11 pages).

* cited by examiner

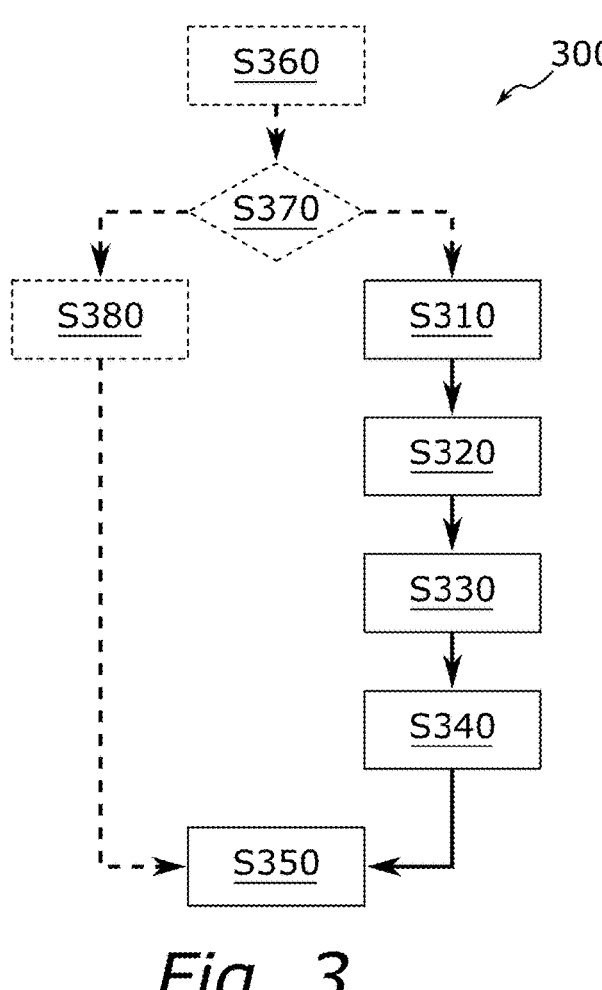
*Fig. 3*
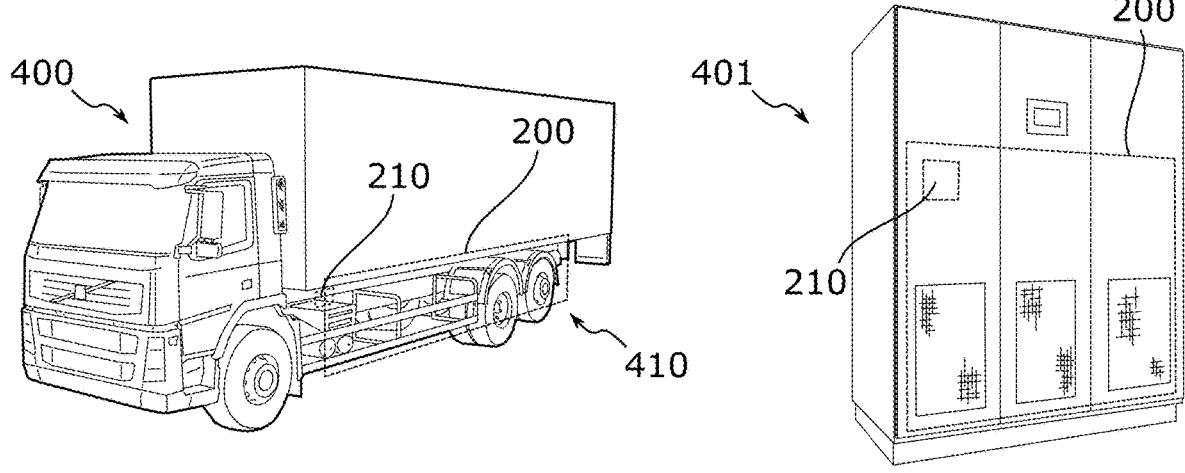
*Fig. 4A*          *Fig. 4B*

CONTROL OF AN HETEROGENOUS ENERGY STORAGE SYSTEM

TECHNICAL FIELD

The disclosure relates generally to controlling of energy storage systems. In particular aspects, the disclosure relates to control of an energy storage system having a plurality of heterogenous battery packs. The disclosure can be applied to energy storage systems found in heavy-duty vehicles, such as trucks, buses, and construction equipment, among other vehicle types. Although the disclosure may be described with respect to a particular vehicle, the disclosure is not restricted to any particular type of vehicle. The disclosure also applies to energy storage systems found and used outside the field of heavy-duty vehicles.

BACKGROUND

Energy storage systems (ESSs) are essential components of electric vehicles, as they are responsible for providing the power needed to e.g. drive the electric motors and keep the vehicles running. An ESS may also be used for other purposes, such as in various (micro-) grid solutions and renewable energy systems, and similar. In some situations, a same energy storage system can be used both to provide power to electric motors of a vehicle and to provide power to e.g. a building, such as conceptualized by various vehicle-to-grid (V2G) solutions.

Many ESSs store energy by using batteries, such as by using a plurality of battery packs. By connecting several battery packs in series, the output voltage of the ESS can be increased, while connecting several battery packs in parallel allows to increase the overall storage capacity for a same output voltage. Especially for battery packs connected in parallel, it may be desirable if all battery packs are homogenous with similar or same characteristics and age, as it may be more difficult to control heterogenous packs if not being able to rely on a same state of charge (SoC) and same voltage set points for all battery packs.

As battery chemistry continues to evolve, newer and newer generations of battery cells and battery packs enter the market, and each new generation is often more effective in terms of both energy density and cost per energy (e.g. kWh) and/or charge (e.g. Ah) compared to its older-generation counterpart. As battery packs may be difficult to store safely, and as battery packs suffer from calendric aging, keeping many different generations of battery packs simultaneously in stock may be undesirable, and finding an identical replacement for a broken battery pack of especially a plurality of parallelly connected battery packs can therefore be a difficult task.

In light of the above, there is therefore a need to allow and enable mixing of e.g. both newer and older generations of battery packs in a same ESS. The present disclosure seeks to evolve contemporary ESS control solutions and to facilitate such mixing of heterogenous battery packs in a same ESS.

SUMMARY

According to a first aspect of the present disclosure, there is provided a computer system for controlling an energy storage system (ESS). The computer system includes processing circuitry configured to: for each battery pack of a plurality of battery packs of the ESS, obtain battery pack-specific minimum and maximum allowed operating voltages; based on the obtained pack-specific minimum and maximum allowed operating voltages, determined joint ESS-specific minimum and maximum voltage limits satisfying each of the respective pack-specific minimum and maximum allowed operating voltages for all of the battery packs; for each battery pack of the plurality of battery packs, obtain an actual state of charge (SoC) value; for each battery pack of the plurality of battery packs, determine a rescaled SoC value by scaling the actual SoC value for the battery pack to a range defined by an estimated SoC value of the battery pack at the ESS-specific minimum and maximum voltage limits; and control the ESS using the rescaled SoC values for the battery packs. The first aspect of the disclosure may seek to solve the problem of how to control heterogenous battery packs of a same ESS. A technical benefit may include that the rescaled SoC values can be used by other parts of the ESS instead of the actual SoC values, thereby allowing these other parts to remain unchanged without additional required modifications.

Optionally, in some examples, including in at least one preferred example, of the computer system, the processing circuitry may be further configured to control the ESS using the rescaled SoC values for the battery packs instead of the actual SoC values of the battery packs. A technical benefit may, as indicated above, be that a control system used to control the ESS may operate as normal, but with the only change that the rescaled SoC values are used instead of the other SoC values.

Optionally, in some examples, including in at least one preferred example, of the computer system, the processing circuitry may be further configured to determine the ESS-specific minimum voltage limit as a maximum of all of the pack-specific minimum allowed operating voltages. A technical benefit may include that a control system operating in accordance with the ESS-specific minimum voltage limit may thus avoid e.g. under-discharging any battery pack.

Optionally, in some examples, including in at least one preferred example, of the computer system, the processing circuitry may be further configured to determine the ESS-specific maximum voltage limit as a minimum of all of the pack-specific maximum allowed operating voltages. A technical benefit may include that a control system operating in accordance with the ESS-specific maximum voltage limit may thus avoid e.g. over-charging any battery pack.

Optionally, in some examples, including in at least one preferred example, of the computer system, the processing circuitry may be further configured to, for each battery pack of the plurality of battery packs, determine the rescaled SoC value for the battery pack as a first SoC value term being proportional to a difference between the actual SoC value of the battery pack and the estimated SoC value of the battery pack at the ESS-specific minimum voltage limit, and further being proportional also to an inverse of a difference between the estimated SoC values of the battery pack at the ESS-specific maximum and minimum voltage limits. A technical benefit may include that such an operation is numerically inexpensive to perform, and may rescale the SoC values of all battery packs to an interval between e.g. zero and one, or a multiple thereof.

Optionally, in some examples, including in at least one preferred example, of the computer system, the processing circuitry may be further configured to: determine a low SoC threshold value and a high SoC threshold value, and determine the rescaled SoC value for each battery pack as the low SoC threshold value plus the first SoC value term multiplied by a difference between the high SoC threshold value and the low SoC threshold value. A technical benefit may include that the rescaled SoC values may thus be caused to all lie within an interval bounded by the low and high SoC threshold values.

Optionally, in some examples, including in at least one preferred example, of the computer system, the processing circuitry may be further configured to estimate one or both of the SoC values of the battery pack at the ESS-specific minimum and maximum voltage limits by using one or more lookup tables mapping voltages to SoCs. A technical benefit may include that the use of more complex and computationally more expensive battery models are thus avoided.

Optionally, in some examples, including in at least one preferred example, of the computer system, the processing circuitry may be further configured to: for each battery pack, determine a battery pack-specific state of energy (SoE) value by integrating an open circuit voltage of the battery pack between the estimated SoC values of the battery pack at the ESS-specific minimum and maximum voltage limits, and determine an ESS-specific SoE value by summing the determined pack-specific SoE values for all battery packs. A technical benefit may include that the SoE of the ESS may thus be calculated based on the rescaled SoC values in a computationally inexpensive way using already determined parameters.

Optionally, in some examples, including in at least one preferred example, of the computer system, the processing circuitry may be further configured to control the ESS based on the determined ESS-specific SoE value. A technical benefit may include that a more sophisticated control of the ESS is thus enabled, in case the overall SoE value of the ESS is a useful parameter.

According to a second aspect of the present disclosure, there is provided an energy storage system (ESS). The ESS includes a plurality of battery packs, and the computer system of the first aspect or any example thereof for controlling the ESS.

According to a third aspect of the present disclosure, there is provided a vehicle (such as e.g. a heavy-vehicle like a bus, tractor, truck, excavator, or any other vehicle requiring an ESS, or e.g. a marine vessel or similar). The vehicle includes an ESS including a plurality of battery packs, and the computer system of the first aspect or any example thereof for controlling the ESS.

Optionally, in some examples, including in at least one preferred example, of the vehicle, the ESS is configured to power an electric traction of the vehicle. A technical benefit includes that heterogenous battery packs may thus be used to provide power to the electric traction (i.e. to one or more electrical machines used to propel the vehicle).

According to a fourth aspect of the present disclosure, there is provided a computer-implemented method for controlling an ESS. The method is performed by processing circuitry of a computer system (such as that of the first aspect), and includes: for each battery pack of a plurality of battery packs of the ESS, obtaining (using the processing circuitry) battery pack-specific minimum and maximum allowed operating voltages; based on the obtained pack-specific minimum and maximum allowed operating voltages, determining (using the processing circuitry) joint ESS-specific minimum and maximum voltage limits satisfying each of the respective pack-specific minimum and maximum voltage allowed operating voltages for all of the battery packs; for each battery pack of the plurality of battery packs, obtaining (using the processing circuitry) an actual SoC value; for each battery pack of the plurality of battery packs, determining (using the processing circuitry) a rescaled SoC value by scaling the actual SoC value for the battery pack to a range defined by an estimated SoC value of the battery pack at the ESS-specific minimum and maximum voltage limits, and controlling the ESS using the rescaled SoC values for the battery packs.

According to a fifth aspect of the present disclosure, there is provided a computer program product that includes computer program code for performing, when executed by processing circuitry (of e.g. the computer system of the first aspect) the method of the fourth aspect.

According to a sixth aspect of the present disclosure, there is provided a computer-readable storage medium that includes instructions (e.g. computer program code) for performing, when executed by processing circuitry (of e.g. the computer system of the first aspect) the method of the fourth aspect. The storage medium may be non-transitory.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 3 schematically illustrates a flowchart of an exemplary method for controlling an ESS according to an example.

FIG. 4A schematically illustrates an exemplary vehicle including an ESS according to an example.

FIG. 4B schematically illustrates an exemplary ESS according to an example.

DETAILED DESCRIPTION

The detailed description set forth below provides information and examples of the disclosed technology with sufficient detail to enable those skilled in the art to practice the disclosure.

Figure 1:
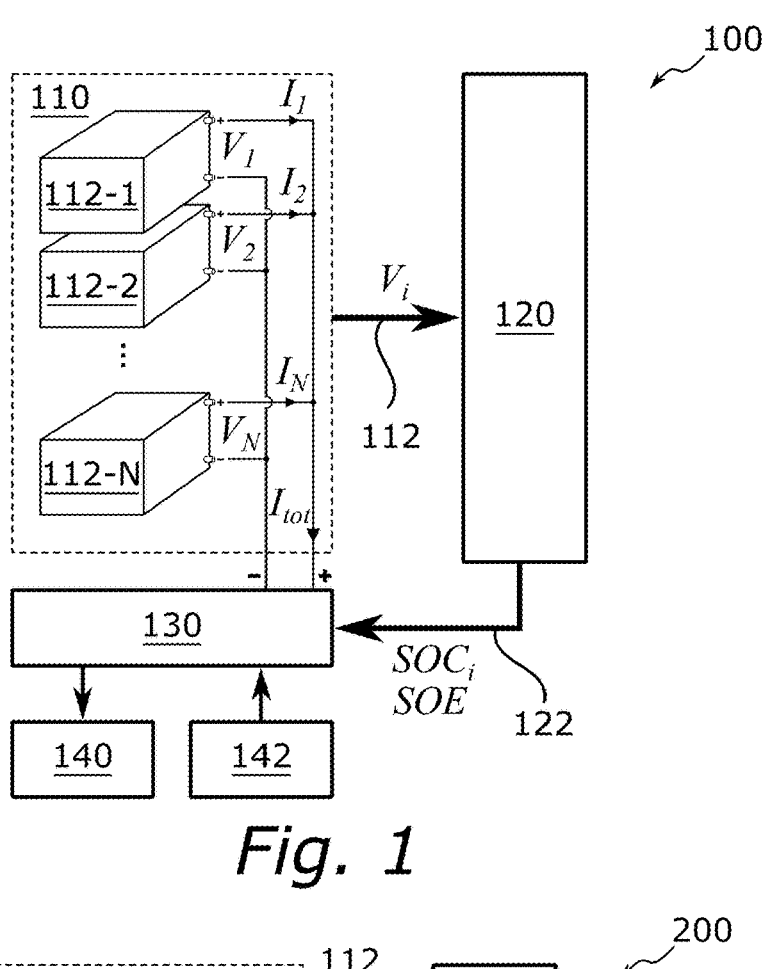
FIG. 1 schematically illustrates a typical contemporary energy storage system (ESS) and a contemporary solution for control thereof.

FIG. 1A schematically illustrates the workings of a contemporary energy storage system (ESS) 200 and a contemporary solution for control thereof. The ESS 100 includes a battery pack arrangement 110 that includes a plurality of battery pack 112-1 to 112-N (where N is an integer indicating a total number of such battery packs), wherein the battery packs 112-1 to 112-N are connected in parallel. Each battery pack 112-$i$ has an output voltage $V_i$ across its terminals, and contributes a current $I_i$ towards a total output current $I_{tot} = \Sigma I_i$. The values $V_i$ of the terminal voltage of each battery pack 112-$i$ are provided to a state estimator 120, in form of e.g. a message 112 (that may be a signal or any other form of communication suitable for transferring such information).

The values $V_i$ may for example be measured by one or more sensors (not shown) provided as part of the battery pack arrangement 110, or similar. Based on the values $V_i$, the state estimator 120 is configured to estimate e.g. a current state of charge ($SOC_i$) for each i:th battery pack (where $i \in [1, \ldots, N]$), and in some cases also one or more other states (e.g. SoX) of the battery pack arrangement 110 and battery packs 112-1 to 112-N, such as for example a state of energy (SoE). The outputs from the state estimator 120 are in turn provided, e.g. as part of a message 122, to a charge/discharge interface 130 by which e.g. a discharging of energy from the battery pack arrangement 110 to an energy consumer 140, and/or e.g. a charging of energy to the battery pack arrangement 110 from an energy provider 142, is controlled based on the state estimates SOC; (and e.g. SoE). An energy consumer 140 may for example be an electric traction/propulsion of a vehicle (such as one or more electrical machines), lights, a building, or any other system powered by electricity and suitable to be powered by the ESS 100. Likewise, an energy provider 142 may e.g. be a generator, such as found in a power plant, a solar cell arrangement, a wind turbine, or e.g. an electrical machine operating as a regenerative braking device, or similar.

As mentioned earlier herein, controlling of the ESS 100, e.g. controlling the charging/discharging of the battery pack arrangement 110 may become difficult as soon as the individual characteristics of the battery packs 112-1 to 112-N start to differ from each other. Herein, that two battery packs are considered to have different individual characteristics can include the battery packs having e.g. different internal resistances, different remaining storage capacities (e.g. state of health, SOH), different relations between terminal voltage and SoC, different ages, or e.g. different cell chemistries in general. For example, control of an ESS with heterogenous battery packs may be more intricate than control of an ESS with homogenous battery packs, as control cannot rely on same SoCs and volage set points, and calculation of available energy (SoE) and power for discharge and charge may need careful consideration as the current distribution between battery packs may be significantly different (i.e. $I_i \neq I_{j \neq i}$). Differences in open circuit voltages (OCVs), cell capacities, temperature, SoC and other internal cell characteristics like hysteresis and entropy may result in asymmetric current distribution, and some parameters affecting the current distribution may also depend on the history of usage of each battery pack. Differences in internal resistance and OCV (as a function of e.g. SoC and temperature) may cause immediate imbalances in current splits, while longer-term imbalances may result from differences in storage capacity, hysteresis and aging-related parameter-changes. As a consequence, in contemporary ESS solutions such as 100, it is often preferable to use homogenous battery packs and avoid including one or more battery packs of dissimilar characteristics. This may however be expensive, as not being able to find a suitable replacement for e.g. a single failed battery pack of a series of parallelly connected battery packs may require to simultaneously replace all of the battery packs.

How the present disclosure improves upon such a contemporary situation will now be described in more detail with reference also to FIG. 2.

Figure 2:
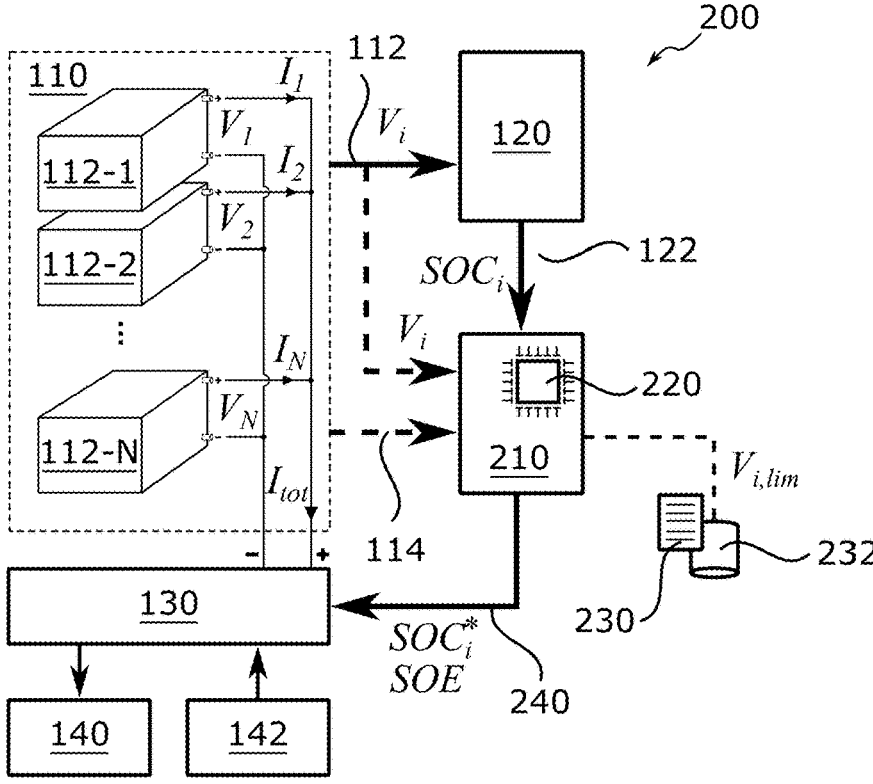
FIG. 2 schematically illustrates an exemplary ESS and an improved solution for control thereof according to an example.

FIG. 2 schematically illustrates an exemplary ESS 200 according to an example of the present disclosure. The overall structure of the battery pack arrangement 110, the state estimator 120 and the charge/discharge interface 130 remains the same (or is allowed to remain the same). However, the present disclosure proposes to introduce an additional functional module 210 as shown in FIG. 2, that may be implemented by a computer system including processing circuitry 220. Hereinafter, the functionality of the proposed additional functional module 210 will be discussed by referring to a computer system configured to implement the envisaged functionality of the module 210, and the same reference numeral 210 will refer both to the additional functional module as well as to the computer system. This because, as will be described in more detail later herein, a same computer system may e.g. be used also to implement e.g. all or part of the state estimator 120, part of the charge/discharge interface 130, and similar. In particular, the proposed additional functional module 210 has the advantage that it can be added to an already existing management system for a battery arrangement (such as 110) of an ESS (such as 100), by e.g. introducing changes to the programming/software of a computer system already used to implement parts of the ESS.

The processing circuitry 220 is configured to obtain battery pack-specific minimum and maximum allowed operating voltages $V_{i,lim}$. These limitations are indicative of e.g. a minimum terminal voltage $V_{i,min}$ that the battery pack should not go below during discharging of the battery pack, and e.g. a maximum terminal voltage $V_{i,max}$ that the battery pack should not exceed during charging of the battery pack, i.e. $V_{i,lim} = [V_{i,min}, V_{i,max}]$. Such limitations may e.g. be specified and provided by a manufacturer of the battery pack, and may e.g. be based on specifics of the individual battery cells used to form the battery pack. As envisaged herein, the processing circuitry 220 may e.g. be configured to obtain such values from a storage 232, in form of data 230. Such a storage 232 may e.g. be internal to the computer system 210 or external to the computer system 210. In some examples, such limitations may be stored as part of the battery pack arrangement 110 and/or as part of each battery pack, and may be provided to the computer system 210 as part of a message 114 read from the battery pack arrangement 110 by the computer system 210 and processing circuitry 220.

Based on the obtained limitations $V_{i,lim}$, the processing circuitry 220 is further configured to determine (e.g. calculate) so-called joint ESS-specific minimum and maximum voltage limits $V_{lim}$ that satisfy each of the respective pack-specific minimum and maximum allowed operating voltages $V_{i,lim}$ for all of the battery packs 112-1 to 112-N.

For example, $V_{lim}$ can be defined as $V_{lim} = [V_{min}, V_{max}]$, where $$V_{min} = \max_i V_{i,min}$$

and $$V_{max} = \min_i V_{i,max},$$

e.g. such that $V_{min}$ is the highest possible voltage that satisfies all the maximum voltage requirements of all the battery packs, and such that $V_{max}$ is the lowest possible voltage that satisfies all the minimum voltage requirements of all the battery packs.

The processing circuitry 220 is further configured to obtain an actual state of charge value $SOC_i$ for each of the battery packs 112-1 to 112-N, e.g. a present-time SoC for each battery pack. For this purpose, the processing circuitry

220 may obtain such values as part of a message 122 received from the state estimator 120, if such a state estimator 120 is already provided as part of the ESS 200. The SoC for a battery pack may be determined based on the OCV of the battery pack during e.g. fully relaxed conditions. Under load, the SoC may instead be estimated based on the terminal voltage (e.g. closed circuit voltage, CCV) and various model-based estimation methods, such as equivalent circuit models (ECM), recursive least squares (RLS), Kalman or Bayesian filters, Leunberger observers, high-gain observers, and similar, and e.g. be based on Coulomb counting and/or CCV measurements. Phrased differently, if SoC is preferably determined by knowledge about the OCV, the OCV may, during load (i.e. during use of the vehicle) be estimated based on the measured terminal voltage of the battery pack. If not provided by the state estimator 120, it is envisaged that in some examples, the processing circuitry 220 can itself determine such $SOC_i$ values based on e.g. the terminal voltages $V_i$, in which case the processing circuitry 220 receives such values for $V_i$ from e.g. one or more sensors of the battery pack arrangement 110, as part of e.g. the message 112, and in which case the state estimator 120 may be optional (at least for what concerns the implementation of the additional functional module 210).

As envisaged herein, a terminal voltage $V_i$ may be an open-circuit voltage (OCV) for the i:th battery pack. The same applies to the battery pack-specific minimum and maximum allowed operating voltages $V_{i,lim}$, that may be defined as voltage values at steady-state (e.g. relaxed-state OCV values, such as values obtained when not charging or discharging the battery pack). In other examples, $V_i$ may be terminal voltage under load, from which e.g. OCV may be estimated if needed.

The processing circuitry 210 is further configured to determine a rescaled SoC value $SOC_i^*$ for each i:th battery pack. This is performed by scaling the actual SoC value $SOC_i$ for the battery pack to a range defined by an estimated SoC value of the battery pack at each of the ESS-specific minimum and maximum voltage limits. This may include to estimate a SoC value for the battery pack at the ESS-specific minimum voltage limit, e.g. a SoC value $SOC_{i,min}$ at $V_{min}$, and to estimate a SoC value for the battery pack at the ESS-specific maximum voltage limit, e.g. a SoC value $SOC_{i,max}$ at $V_{max}$. This may be achieved by using mapped knowledge about how the SoC of a particular battery pack depends on its open circuit terminal voltage, or similar. For example, a lookup table function LUT:V→SOC may be used, that maps a particular voltage to a particular SoC. In some examples, there may be one such lookup table for each battery pack, i.e. $LUT_i$:V→$SOC_i$, or similar, i.e. $LUT_i$ may be different for different battery packs. For example, one may obtain $SOC_{i,min}$=LUT($V_{min}$) or $SOC_{i,min}$=$LUT_i$($V_{min}$), and $SOC_{i,max}$=LUT($V_{max}$) or $SOC_{i,max}$=$LUT_i$($V_{max}$). Such mapped knowledge may e.g. be obtained from storage 232 as part of data 230, or e.g. be obtained from the battery pack arrangement 110 itself as part of e.g. message 114.

For example, after having obtained $SOC_i$, $SOC_{i,min}$ and $SOC_{i,max}$ for each battery pack 112-1 to 112-N, the processing circuitry 210 may perform such scaling by determining a first SoC term $T_1$ proportional to a difference between the actual $SOC_i$ value and the estimated SoC value of the battery pack at the ESS-specific minimum voltage limit, i.e. such that $T_1 \propto SOC_i - SOC_{i,min}$. The term $T_1$ may also be made proportional also to an inverse of a difference between the estimated SoC values of the battery pack at the ESS-specific maximum and minimum voltage limits, i.e. such that $T_1 \propto$ $(SOC_i - SOC_{i,min})/(SOC_{i,max} - SOC_{i,min})$. For example, the rescaled SoC value $SOC_i^*$ for a battery pack may be defined as $$SOC_i^* = \frac{(SOC_i - SOC_{i,min})}{SOC_{i,max} - SOC_{i,min}},$$

such that $SOC_i^*$ belongs to the interval $[0,1]$ (assuming that $SOC_i$ also belongs to the interval $[0,1]$), or e.g. be defined as $$SOC_i^* = \frac{SOC_i - SOC_{i,min}}{SOC_{i,max} - SOC_{i,min}} \times 100,$$

if it is instead desired that $SOC_i^*$ belongs to the interval $[0,100]$ (e.g. from 0% to 100%).

In case e.g. the charge/discharge interface 130 is configured to use some other interval than $[0,1]$ or $[0,100]$, such as e.g. from $SOC_{lim,min}$ to $SOC_{lim,max}$, the processing circuitry 220 may in some examples instead calculate $SOC_i^*$ as $$SOC_i^* = SOC_{lim,min} + \frac{SOC_i - SOC_{i,min}}{SOC_{i,max} - SOC_{i,min}} \times (SOC_{lim,max} - SOC_{lim,min}).$$

In some examples, the processing circuitry 220 may be further configured to determine a state of energy (SoE) value for each battery pack, e.g. in accordance with $$SOE_i = \int_a^b OCV(SOC) \cdot dSOC,$$

i.e. by integrating the open-circuit voltage curve (as a function of SoC) of the battery pack between the estimated SoC values of the battery pack at the ESS-specific minimum and maximum voltage limits, e.g. such that (in the above integral) $\alpha$ is the estimated SoC value at the ESS-specific minimum voltage limit and b is the estimated SOC value at the ESS-specific maximum voltage limit.

In some examples, the processing circuitry 220 may be further configured to determine an overall state of energy SoE value for all battery packs 112-1 to 112-N, e.g. in accordance with $$SOE = \sum_{i=1}^{N} SOE_i,$$

i.e. by summing the determined pack-specific SoE values for all battery packs.

In some examples, an average SoC for the whole ESS (e.g. for the whole battery pack arrangement 110) may be determined as an average of the rescaled SoC values $SOC_i$, e.g. as $$SOC^* = \sum_{i=1}^{N} SOC_i^*.$$

After having determined at least $SOC_i^*$, the processing circuitry 220 may then control the ESS 200 using $SOC_i^*$ instead of $SOC_i$, i.e. by using the rescaled SoC values for the battery packs 112-1 to 112-N instead of the actual SoC values $SOC_i$. Herein, that the processing circuitry 220 "controls the ESS" may include that the processing circuitry 220 provides the rescaled SoC values $SOC_i^*$ to the charge/discharge interface instead of $SOC_i$.

In particular, as the present disclosure proposes to replace $SOC_i$ with $SOC_i^*$, the other various parts responsible for controlling the ESS 200 (such as the charge/discharge interface 130) can be left unchanged, and continue to operate as usual by assuming that each battery pack has an actual SoC value equal to the rescaled SoC value.

By providing the rescaled SoC values, the processing circuitry 220 and computer system 210 enables the ESS 200 to operate within limits that are safe for all battery packs, wherein the limits will automatically be defined based on the least capable battery pack in terms of state of health (SOH) and similar. The same applies to basically all other equipment and/or functionality of e.g. a vehicle in which the ESS 200 is included, as these may continue to operate as usual but by using $SOC_i^*$ instead of $SOC_i$. Things like charging current limits, available energy, and similar is calculated as usual, but based on the operating window defined by $SOC_i^*$ instead of $SOC_i$. Current split may be calculated using e.g. Kirchhoff's circuit laws. A model of each battery pack may be approximated as an open circuit voltage and series resistance, where the open circuit voltage follows from the state of charge and temperature, and wherein the series resistance accounts for polarization voltage resulting from internal resistance of the battery pack. The proposed solution of the present disclosure allows handling of heterogenous battery packs with different SoC-OCV characteristics, by recalculating (i.e. rescaling) the operational voltage range of the ESS and thereby avoiding over-charging or under-discharging any battery pack.

Control of the ESS 200 may be performed without the need for additional electronics (except for the additional resources needed to implement the functionality of the computer system 210 (additional functional module). If using lookup tables to derive SoC based on voltage, the need for more complicated battery models is also avoided. The proposed approach to controlling an ESS with heterogeneous battery packs can also be implanted with low computational requirements, and e.g. be performed by an already existing computer system of e.g. a vehicle, such as an electronic control unit (ECU) or similar.

A flow of a method for controlling a heterogenous ESS, as envisaged being performed by the computer system 210 and processing circuitry 220, will now be described in more detail with reference also to FIG. 3.

FIG. 3 schematically illustrates a flowchart of an exemplary method 300 for controlling a heterogenous ESS (such as e.g. the ESS 200). As part of an operation S310, the method 300 includes to obtain pack-specific minimum and maximum allowed operating voltages, i.e. $V_{i,lim}$, for each battery pack of a plurality of battery packs of the ESS (such as for the battery packs 112-1 to 112-N). As part of an operation S320, the method 300 includes to determine joint ESS-specific minimum and maximum voltage limits $V_{lim}$ that satisfies each of the respective pack-specific minimum and maximum allowed operating voltages for all of the battery packs, based on the obtained pack-specific minimum and maximum allowed operating voltages. As part of an operation S330, the method 300 includes to obtain an actual state of charge $SOC_i$ for each i:th battery pack of the plurality of battery packs. As part of an operation S340, the method 300 further includes to determine a rescaled SoC value, i.e. $SOC_i^*$, for each battery pack of the plurality of battery packs, by scaling the actual SoC value $SOC_i$ for the battery pack to a range defined by an estimated SoC value of the battery pack at the ESS-specific minimum and maximum voltage limits $V_{lim}$. Finally, as part of an operation S350, the method 300 includes to control the ESS using the rescaled SoC values $SOC_i^*$ for the battery packs.

Optionally, in some examples, the method 300 may include an earlier operation S360 in which data pertinent to individual battery pack characteristics is obtained. Such data may for example include battery pack part numbers, data indicative of battery cell capacities, or any other data from which it may be figured out whether the battery packs of the ESS are heterogenous or not. Based on the data obtained in operation S360, a following operation S370 of the method 300 may include to check whether the battery packs of the ESS are heterogenous or not. If affirmative, the method 300 may proceed with operation S310 as described above, and start the process of rescaling the SoC values. If not affirmative, the method 300 may instead proceed with an operation S380 in which the actual SoC values $SOC_i$ are obtained, and such that the operation S350 may instead include to control the ESS based on these actual SoC values instead of on any rescaled SoC values. Thus, in some examples, the method 300 may be used for both homogenous and heterogenous battery packs, wherein the former includes controlling the ESS using the actual SoC values, and wherein the latter includes controlling the ESS using recalculated SoC values. For example, in case it is determined that the battery packs are of sufficiently close characteristics, i.e. that they are considered homogenous, the operation S380 may include to obtain a set of predefined parameters for all battery packs, such as e.g. predefined tables mapping voltage to SoC similar for all battery packs.

FIG. 4A schematically illustrates an exemplary vehicle 400 according to examples of the present disclosure. The vehicle 400 is a heavy vehicle in form of a truck, but may of course be any other type of vehicle, including also e.g. a marine vessel or similar. The vehicle 400 has an electric traction 410, i.e. one or more electrical machines (motors) configured to propel the vehicle 400. The vehicle 400 further includes an energy storage system (ESS) 200 (such as described with reference to FIG. 2), and the ESS 200 includes a computer system 210 (such as also described with reference to FIG. 2). The computer system 210 is configured to control the ESS 200, by providing e.g. the rescaled SoC values in case the battery packs of the ESS are heterogenous.

FIG. 4B schematically illustrates an exemplary device 401 that is not a vehicle, to illustrate that the proposed solution of the present disclosure is applicable also to other systems than vehicles. In this example, the device 401 is a battery bank used to delivery energy to (and/or to receive and store energy from) a power grid, and may be installed as part of the grid itself or e.g. as part of a building or similar. The device 401 includes an energy storage system (ESS) 200 (such as described with reference to FIG. 2), and the ESS includes a computer system 210 (such as also described with reference to FIG. 2), responsible for controlling the ESS 200 as described herein. The device 401 may for example include one or more battery packs that have been harvested from e.g. an electric vehicle, e.g. represent so-called "second use" wherein battery packs that are no longer considered useful in electric vehicles may still be used in other, less demanding applications, such as home energy storage solutions, off-grid solutions, grid solutions, and similar. In particular, in such solutions, the "risk" of at least some of the battery packs having different characteristics (and thus being heterogenous) may be substantial, and the proposed solution of the present disclosure may help to control also such heterogenous ESS-based solutions in a safer and more efficient way.

As a comment to all of the above, it is noted that in order for the proposed solution to work efficiently, there may be an upper limit to how much the characteristics of e.g. two battery packs in a same ESS may differ. If the differences are too great, e.g. with too different SoC-voltage curves, the proposed solution may provide an operational window (e.g. as defined by the joint ESS-specific minimum and maximum voltage limits) that is too narrow to provide enough energy or power for an actual usage. However, it is envisaged that there may be multiple situations wherein battery packs are sufficiently heterogenous such that conventional solutions for control are not desirable, but where the battery packs are not too different in their characteristics for the propose solution to be useful.

Figure 5:
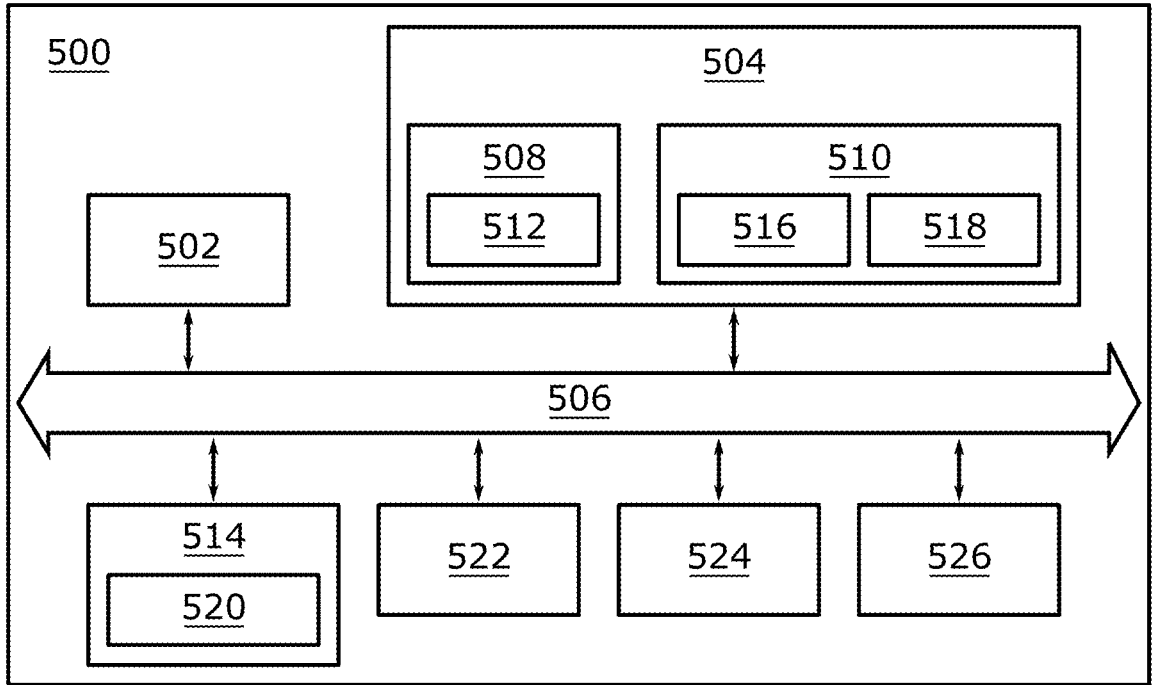
FIG. 5 schematically illustrates a diagram of an exemplary computer system for implementing examples disclosed herein, according to an example.

FIG. 5 schematically illustrates a diagram of an exemplary computer system 150 for implementing examples disclosed herein. The computer system 500 is adapted to execute instructions from a computer-readable medium to perform these and/or any of the functions or processing described herein. The computer system 500 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include processing circuitry 502 (e.g., processing circuitry including one or more processor devices or control units), a memory 504, and a system bus 506. The computer system 500 may include at least one computing device having the processing circuitry 502. The system bus 506 provides an interface for system components including, but not limited to, the memory 504 and the processing circuitry 502. The processing circuitry 502 may include any number of hardware components for conducting data or signal processing or for executing computer code stored in memory 504. The processing circuitry 502 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 502 may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out actions described herein. Thus, the computer-readable program code of the computer program 520 can comprise software instructions for implementing the functionality of the examples described herein when executed by the processing circuitry 502. In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502. The processing circuitry 502 may serve as a controller or control system for the computer system 500 that is to implement the functionality described herein.

The computer system 500 may include an input device interface 522 configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces, such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

In summary of all of the above, the present disclosure improves upon currently available technology in that enables to handle and control heterogenous battery packs of an ESS by providing rescaled SoC values that allows the remaining parts of the ESS to operate as usual, without requiring further modifications. This reduces the complications following from a need to mix battery packs of e.g. different generations, age and overall characteristics in a same ESS, such as often envisaged in second life/use applications and/or wherein a replacement of a full plurality of parallelly connected battery packs would otherwise be required. Being allowed to mix battery packs of different characteristics may also reduce the need for e.g. an OEM or supplier to store and stock different generations of battery packs, which may otherwise consume lots of storage space, and also lead to calendric aging of the battery packs.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The following is an exemplifying list of examples envisaged herein:

Example 1: A computer system (210) for controlling an energy storage system, ESS (200), the computer system including processing circuitry (220) configured to: for each battery pack (112-$i$) of a plurality of battery packs (110) of the ESS, obtain pack-specific minimum and maximum allowed operating voltages ($V_{i,lim}$); based on the obtained pack-specific minimum and maximum allowed operating voltages, determine joint ESS-specific minimum and maximum voltage limits ($V_{lim}$) satisfying each of the respective pack-specific minimum and maximum allowed operating voltages for all of the battery packs; for each battery pack of the plurality of battery packs, obtain an actual state-of-charge, SoC, value ($SOC_i$); for each battery pack of the plurality of battery packs, determine a rescaled SoC value ($SOC_i^*$) by scaling the actual SoC value for the battery pack to a range defined by an estimated SoC value of the battery pack at the ESS-specific minimum and maximum voltage limits, and control the ESS using the rescaled SoC values for the battery packs.

Example 2: The computer system of example 1, wherein the processing circuitry is further configured to control the ESS using the rescaled SoC values for the battery packs instead of the actual SoC values of the battery packs.

Example 3: The computer system of example 1 or 2, wherein the processing circuitry is further configured to determine the ESS-specific minimum voltage limit as a maximum of all of the pack-specific minimum allowed operating voltages.

Example 4: The computer system of any one of examples 1 to 3, wherein the processing circuitry is further configured to determine the ESS-specific maximum voltage limit as a minimum of all of the pack-specific maximum allowed operating voltages.

Example 5: The computer system of any one of the preceding examples, wherein the processing circuitry is further configured to, for each battery pack of the plurality of battery packs, determine the rescaled SoC value for the battery pack as a first SoC value term being proportional to a difference between the actual SoC value of the battery pack and the estimated SoC value of the battery pack at the ESS-specific minimum voltage limit, and further being proportional also to an inverse of a difference between the estimated SoC values of the battery pack at the ESS-specific maximum and minimum voltage limits.

Example 6: The computer system of example 5, wherein the processing circuitry is further configured to: determine a low SoC threshold value and a high SoC threshold value, and determine the rescaled SoC value for each battery pack as the low SoC threshold value plus the first SoC value term multiplied by a difference between the high SoC threshold value and the low SoC threshold value.

Example 7: The computer system of any one of the preceding examples, wherein the processing circuitry is further configured to estimate one or both of the SoC values of the battery pack at the ESS-specific minimum and maximum voltage limits by using one or more lookup tables mapping voltages to SoCs.

Example 8: The computer system of any one of the preceding examples, wherein the processing circuitry is further configured to: for each battery pack, determine a pack-specific state-of-energy, SoE, value by integrating an open circuit voltage of the battery pack between the estimated SoC values of the battery pack at the ESS-specific minimum and maximum voltage limits, and determine an ESS-specific SoE value by summing the determined pack-specific SoE values for all battery packs.

Example 9: The computer system of example 8, wherein the processing circuitry is further configured to control the ESS based on the determined ESS-specific SoE value.

Example 10: The computer system of any one of the preceding examples, wherein the processing circuitry is further configured to control the ESS using the rescaled SoC values for the battery packs in response to determining that at least two battery packs of the plurality of battery packs have non-matching internal characteristics, such as being different generations of a same battery pack type and/or of different age.

Example 11: An energy storage system, ESS, (200) including: a plurality (110) of battery packs (112-i), and the computer system (210) of any one of examples 1 to 10 for controlling the ESS.

Example 12: A vehicle (400) including an energy storage system, ESS, (200) including a plurality (110) of battery packs (112-i), and the computer system (210) of any one of examples 1 to 11 for controlling the ESS.

Example 13: The vehicle of example 12, wherein the ESS is configured to power an electric traction (410) of the vehicle.

Example 14: A computer-implemented method (300) for controlling an energy storage system, ESS, the method being performed by processing circuitry of a computer system the method including: for each battery pack of a plurality of battery packs of the ESS, obtaining (S310) pack-specific minimum and maximum allowed operating voltages ($V_{i,lim}$); based on the obtained pack-specific minimum and maximum allowed operating voltages, determining (S320) joint ESS-specific minimum and maximum voltage limits ($V_{lim}$) satisfying each of the respective pack-specific minimum and maximum allowed operating voltages for all of the battery packs; for each battery pack of the plurality of battery packs, obtaining (S330) an actual state-of-charge, SoC, value ($SOC_i$); for each battery pack of the plurality of battery packs, determining (S340) a rescaled SoC-value ($SOC_i^*$) by scaling the actual SoC value for the battery pack to a range defined by an estimated SoC value of the battery pack at the ESS-specific minimum and maximum voltage limits, and controlling (S350) the ESS using the rescaled SoC values for the battery packs.

Example 15: A computer program product including computer program code for performing, when executed by processing circuitry, the method of example 14.

Example 16: A computer-readable storage medium including instructions for performing, when executed by processing circuitry, the method of example 14. The storage medium may be non-transitory.

What is claimed is:

1. A computer system for controlling an energy storage system, ESS, the computer system comprising processing circuitry configured to:

for each battery pack of a plurality of battery packs of the ESS, obtain pack-specific minimum and maximum allowed operating voltages;

based on the obtained pack-specific minimum and maximum allowed operating voltages, determine joint ESS-specific minimum and maximum voltage limits satisfying each of the respective pack-specific minimum and maximum allowed operating voltages for all of the battery packs;

for each battery pack of the plurality of battery packs, obtain an actual state-of-charge SOC value;

for each battery pack of the plurality of battery packs, determine a rescaled SOC value by scaling the actual SOC value for the battery pack to a range defined by an estimated SOC value of the battery pack at the ESS-specific minimum and maximum voltage limits, and control the ESS using the rescaled SOC values for the battery packs.

2. The computer system of claim 1, wherein the processing circuitry is further configured to control the ESS using the rescaled SOC values for the battery packs instead of the actual SOC values of the battery packs.

3. The computer system of claim 1, wherein the processing circuitry is further configured to determine the ESS-specific minimum voltage limit as a maximum of all of the pack-specific minimum allowed operating voltages and/or wherein the processing circuitry is further configured to determine the ESS-specific maximum voltage limit as a minimum of all of the pack-specific maximum allowed operating voltages.

4. The computer system of claim 1, wherein the processing circuitry is further configured to, for each battery pack of the plurality of battery packs, determine the rescaled SOC value for the battery pack as a first SOC value term being proportional to a difference between the actual SOC value of the battery pack and the estimated SOC value of the battery pack at the ESS-specific minimum voltage limit, and further being proportional also to an inverse of a difference between the estimated SOC values of the battery pack at the ESS-specific maximum and minimum voltage limits.

5. The computer system of claim 4, wherein the processing circuitry is further configured to:

determine a low SOC threshold value and a high SOC threshold value, and determine the rescaled SOC value for each battery pack as the low SOC threshold value plus the first SOC value term multiplied by a difference between the high SoC threshold value and the low SoC threshold value.

6. The computer system of claim 1, wherein the processing circuitry is further configured to estimate one or both of the SoC values of the battery pack at the ESS-specific minimum and maximum voltage limits by using one or more lookup tables mapping voltages to SoCs.

7. The computer system of claim 1, wherein the processing circuitry is further configured to:

for each battery pack, determine a pack-specific state-of-energy, SoE, value by integrating an open circuit voltage of the battery pack between the estimated SoC values of the battery pack at the ESS-specific minimum and maximum voltage limits, and determine an ESS-specific SoE value by summing the determined pack-specific SoE values for all battery packs.

8. The computer system of claim 7, wherein the processing circuitry is further configured to control the ESS based on the determined ESS-specific SoE value.

9. The computer system of claim 1, wherein the processing circuitry is further configured to control the ESS using the rescaled SoC values for the battery packs in response to determining that at least two battery packs of the plurality of battery packs have non-matching internal characteristics, such as being different generations of a same battery pack type and/or of different age.

10. An energy storage system, ESS, comprising:

the plurality of battery packs, and the computer system of claim 1 for controlling the ESS.

11. A vehicle comprising the energy storage system, ESS, including the plurality of battery packs, and the computer system of claim 1 for controlling the ESS.

12. The vehicle of claim 11, wherein the ESS is configured to power an electric traction of the vehicle.

13. A computer-implemented method for controlling an energy storage system, ESS, the method being performed by processing circuitry of a computer system, the method comprising:

for each battery pack of a plurality of battery packs of the ESS, obtaining pack-specific minimum and maximum allowed operating voltages;

based on the obtained pack-specific minimum and maximum allowed operating voltages, determining joint ESS-specific minimum and maximum voltage limits satisfying each of the respective pack-specific minimum and maximum allowed operating voltages for all of the battery packs;

for each battery pack of the plurality of battery packs, obtaining an actual state-of-charge SoC value;

for each battery pack of the plurality of battery packs, determining a rescaled SoC value by scaling the actual SoC value for the battery pack to a range defined by an estimated SoC value of the battery pack at the ESS-specific minimum and maximum voltage limits, and controlling the ESS using the rescaled SoC values for the battery packs.

14. A non-transitory computer-readable storage medium comprising instructions for performing, when executed by processing circuitry, the method of claim 13.

* * * * *